US012684484B2

(12) United States Patent
Gokceli et al.

(10) Patent No.: US 12,684,484 B2
(45) Date of Patent: Jul. 14, 2026

(54) ENERGY SAVING FOR PERIODIC TRANSMISSIONS

(71) Applicant: Nokia Technologies Oy, Espoo (FI)

(72) Inventors: Selahattin Gokceli, Espoo (FI); Ismael Peruga Nasarre, Oulu (FI); Juha Yli-Kaakinen, Tampere (FI); Jukka Olavi Talvitie, Tampere (FI); Esa Tapani Tiirola, Oulu (FI); Kari Pekka Pajukoski, Oulu (FI); Oskari Tervo, Oulu (FI); Mikko Valkama, Nokia (FI)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 18/393,104

(22) Filed: Dec. 21, 2023

(65) Prior Publication Data

US 2024/0224185 A1      Jul. 4, 2024

(30) Foreign Application Priority Data

Jan. 2, 2023    (FI) ...................................... 20235003

(51) Int. Cl.
 *G08C 17/00* (2006.01)
 *H04W 52/02* (2009.01)
(52) U.S. Cl.
 CPC .............................. *H04W 52/0235* (2013.01)
(58) Field of Classification Search
 CPC . H04W 52/02; H04W 52/0216; H04W 84/12; H04W 52/0229; H04W 84/18; H04W 52/0235; H04W 52/0206; Y02D 30/70
 See application file for complete search history.

(56) References Cited

U.S. PATENT DOCUMENTS

| | | | | |
|---|---|---|---|---|
| 6,457,132 | B1 * | 9/2002 | Borgendale ........... | G06F 1/3246 |
| | | | | 713/320 |
| 7,100,062 | B2 * | 8/2006 | Nicholas ............... | G06F 1/3228 |
| | | | | 713/340 |
| 7,769,010 | B2 | 8/2010 | Edlund et al. | |
| 9,730,097 | B2 * | 8/2017 | Yu ......................... | H04W 24/10 |
| 2019/0182699 | A1 | 6/2019 | Shrivastava et al. | |

(Continued)

FOREIGN PATENT DOCUMENTS

EP          3404956 A1    11/2018

OTHER PUBLICATIONS

"New SI: Study on network energy savings for NR", 3GPP TSG RAN Meeting #94e, RP-213554, Agenda: 8A. 1, Huawei, Dec. 6-17, 2021, 5 pages.

(Continued)

*Primary Examiner* — Phuongchau Ba Nguyen
(74) *Attorney, Agent, or Firm* — Robert P. Michal, Esq.; Rimon PC

(57) ABSTRACT

Various techniques are provided for determining, by a network device, a number indicating a quantity of user equipment (UE) that are in an idle state, determining, by the network device, whether the network device can operate in an energy-saving transmission mode based on the number indicating a quantity of UE that are in an idle state, in response to determining the network device can operate in the energy-saving transmission mode using, by the network device, energy-saving transmissions, and notifying, by the network device, at least one UE being served by the network device of the energy-saving transmissions.

6 Claims, 7 Drawing Sheets

(56)                    References Cited

U.S. PATENT DOCUMENTS

| | | | | |
|---|---|---|---|---|
| 2020/0412590 | A1 | 12/2020 | Akkarakaran et al. | |
| 2021/0083911 | A1* | 3/2021 | Morozov | H04L 27/2636 |
| 2022/0417845 | A1 | 12/2022 | Abedini et al. | |
| 2024/0147571 | A1* | 5/2024 | Koskinen | H04W 76/28 |
| 2025/0386226 | A1* | 12/2025 | Liang | H04W 24/10 |

OTHER PUBLICATIONS

"Moderator's summary for discussion [RAN93e-R18Prep-13] Network energy savings", 3GPP TSG RAN Meeting #93-e, RP-211663, Agenda: 9.0.1, Huawei, Sep. 13-17, 2021, pp. 1-55.

"Draft Report of 3GPP TSG RAN WG1 #109-e v0.3.0", 3GPP TSG RAN WG1 Meeting #110-e, R1-220xxxx, MCC Support, Aug. 22-26, 2022, pp. 1-242.

"Revised SID on Study on NR coverage enhancements", 3GPP TSG RAN Meeting #88e, RP-200861, Agenda: 9.9.4, China Telecom, June 29-Jul. 3, 2020, 4 pages.

"3rd Generation Partnership Project; Technical Specification Group Radio Access Network; Study on NR coverage enhancements (Release 17)", 3GPP TR 38.830, V17.0.0, Dec. 2020, pp. 1-91.

"Motivation for Network Energy Saving in Rel-18", 3GPP TSG RAN Rel-18 workshop, RWS-210310, Agenda: 4.1, Ericsson, Jun. 28-Jul. 2, 2021, pp. 1-7.

"Network energy saving and green operation for N$", 3GPP TSG RAN Rel-18 workshop, RWS-210447, Agenda: 4.3, Huawei, Jun. 28-Jul. 2, 2021, 6 pages.

Souad et al., "SOCP Approach for Reducing PAPR System SC-FDMA in Uplink via Tone Reservation", International Journal of Computer Networks & Communications (IJCNC), vol. 3, No. 6, Nov. 2011, pp. 157-168.

Yu et al., "A Low Complexity Tone Reservation Scheme Based on Time-Domain Kernel Matrix for PAPR Reduction in OFDM Systems", IEEE Transactions on Broadcasting, vol. 61, No. 4, Dec. 2015, pp. 710-716.

Ivanov et al., "Selective tone reservation for PAPR reduction in wireless communication systems", IEEE International Workshop on Signal Processing Systems (SiPS), Oct. 3-5, 2017, 6 pages.

Chen et al., "Iterative estimation and cancellation of clipping noise for OFDM signals", IEEE Communications Letters, vol. 7, No. 7, Jul. 2003, pp. 305-307.

Wang et al., "Optimized Iterative Clipping and Filtering for PAPR Reduction of OFDM Signals", IEEE Transactions on Communications, vol. 59, No. 1, Jan. 2011, pp. 33-37.

Zhu et al., "Simplified Approach to Optimized Iterative Clipping and Filtering for PAPR Reduction of OFDM Signals", IEEE Transactions on Communications, vol. 61, No. 5, May 2013, pp. 1891-1901.

Fehri et al., "Crest Factor Reduction of Inter-Band Multi-Standard Carrier Aggregated Signals", IEEE Transactions on Microwave Theory and Techniques, vol. 62, No. 12, Dec. 2014, pp. 3286-3297.

Traverso, "A new family of filters for PAPR reduction of carrier aggregated signals", IEEE Wireless Communications and Networking Conference, Apr. 3-6, 2016, 6 pages.

Wang et al., "Analysis of Clipping Noise and Tone-Reservation Algorithms for Peak Reduction in OFDM Systems", IEEE Transactions on Vehicular Technology, vol. 57, No. 3, May 2008, pp. 1675-1694.

Gokceli et al., "Frequency-Selective PAPR Reduction for OFDM", IEEE Transactions on Vehicular Technology, vol. 68, No. 6, Jun. 2019, pp. 6167-6171.

Office action received for corresponding Finnish Patent Application No. 20235003, dated May 29, 2023, 14 pages.

"Counting in E-MBMS", 3GPP TSG RAN WG2 #58, R2-072523, Agenda: 4.6, IPWireless, Jun. 25-29, 2007, 4 pages.

"Initial access and mobility procedures for NR unlicensed", 3GPP TSG RAN WG1 Meeting #96bis, R1-1905000, Agenda: 7.2.2.2.2, Qualcomm Incorporated, Apr. 8-12, 2019, pp. 1-15.

"3rd Generation Partnership Project; Technical Specification Group Radio Access Network; Study on network energy savings for NR (Release 18)", 3GPP TR 38.864, V1.0.0, Dec. 2022, pp. 1-71.

* cited by examiner

Example Wireless Network 130

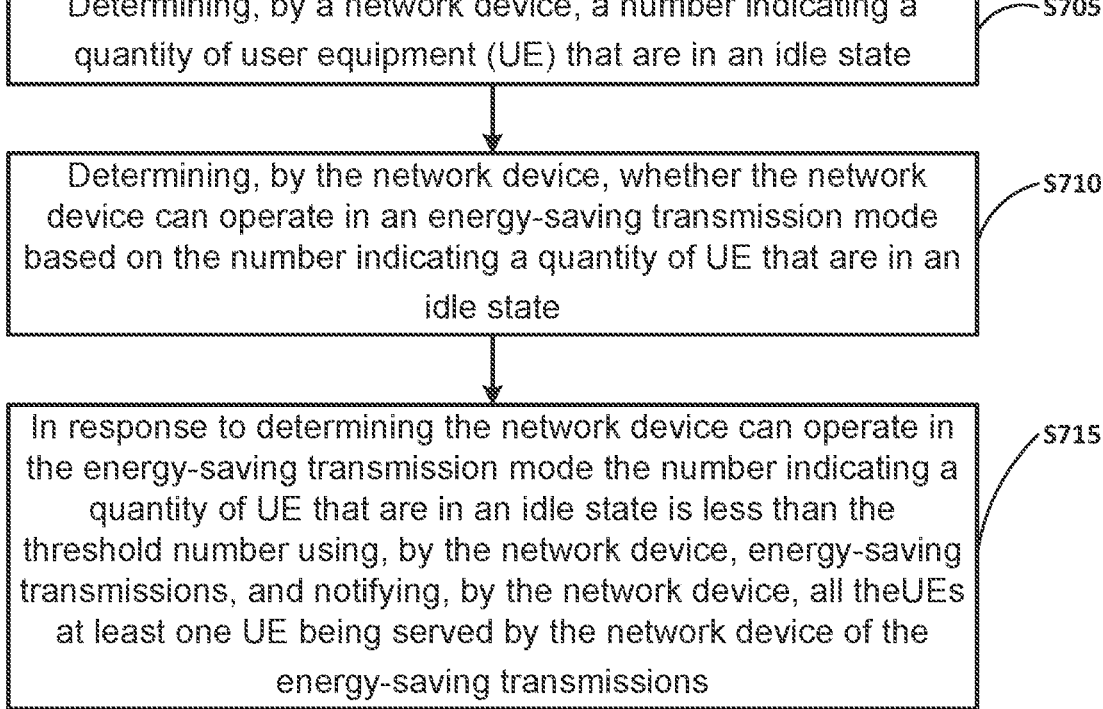

Determining, by a network device, a number indicating a quantity of user equipment (UE) that are in an idle state — S705

Determining, by the network device, whether the network device can operate in an energy-saving transmission mode based on the number indicating a quantity of UE that are in an idle state — S710

In response to determining the network device can operate in the energy-saving transmission mode the number indicating a quantity of UE that are in an idle state is less than the threshold number using, by the network device, energy-saving transmissions, and notifying, by the network device, all theUEs at least one UE being served by the network device of the energy-saving transmissions — S715

FIG. 7

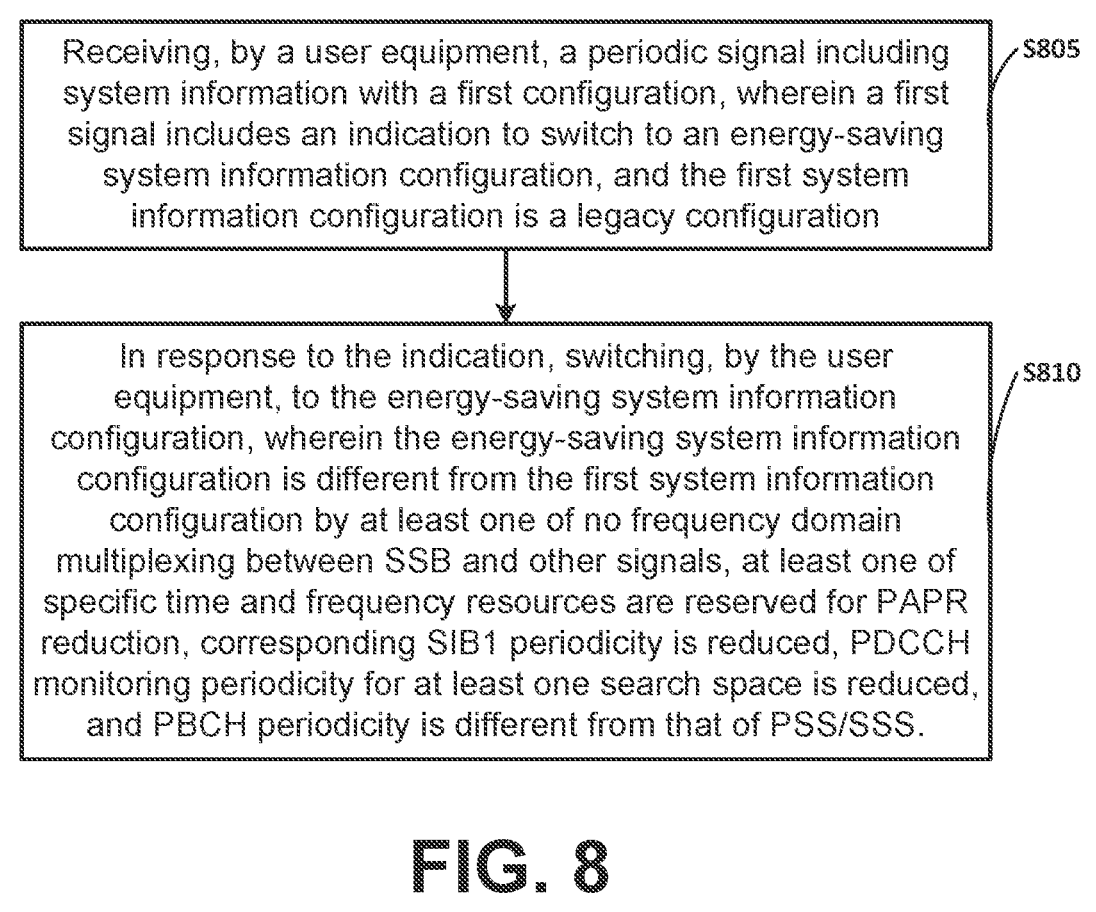

Receiving, by a user equipment, a periodic signal including system information with a first configuration, wherein a first signal includes an indication to switch to an energy-saving system information configuration, and the first system information configuration is a legacy configuration — S805

In response to the indication, switching, by the user equipment, to the energy-saving system information configuration, wherein the energy-saving system information configuration is different from the first system information configuration by at least one of no frequency domain multiplexing between SSB and other signals, at least one of specific time and frequency resources are reserved for PAPR reduction, corresponding SIB1 periodicity is reduced, PDCCH monitoring periodicity for at least one search space is reduced, and PBCH periodicity is different from that of PSS/SSS. — S810

FIG. 8

ENERGY SAVING FOR PERIODIC TRANSMISSIONS

CROSS-REFERENCE TO RELATED APPLICATION

This application claims priority from, and the benefit of, Finland Application No. 20235003, filed on Jan. 2, 2023, the contents of which are hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. The continued mobile broadband evolution can also include 5G-Advanced, 6G, and beyond.

SUMMARY

According to an example embodiment, a method may include determining, by a network device, a number indicating a quantity of user equipment (UE) that are in an idle state, determining, by the network device, whether the network device can operate in an energy-saving transmission mode based on the number indicating a quantity of UE that are in an idle state, in response to determining the network device can operate in the energy-saving transmission mode using, by the network device, energy-saving transmissions, and notifying, by the network device, at least one UE being served by the network device of the energy-saving transmissions.

According to another example embodiment, a method may include receiving, by a user equipment, a periodic signal including system information with a first configuration, wherein a first signal includes an indication to switch to an energy-saving system information configuration, and the first system information configuration is a legacy configuration, in response to the indication, switching, by the user equipment, to the energy-saving system information configuration, wherein the energy-saving system information configuration is different from the first system information configuration by at least one of no frequency domain multiplexing between SSB and other signals, at least one of specific time and frequency resources are reserved for PAPR reduction, corresponding SIB1 periodicity is reduced, PDCCH monitoring periodicity for at least one search space is reduced, and PBCH periodicity is different from that of PSS/SSS.

The details of one or more examples of embodiments are set forth in the accompanying drawings and the description below. Other features will be apparent from the description and drawings, and from the claims.

BRIEF DESCRIPTION OF THE DRAWINGS

FIG. 7 is a block diagram of a method for operating a network device according to an example embodiment.

FIG. 8 is a block diagram of a method for operating a user equipment according to an example embodiment.

DETAILED DESCRIPTION

Figure 1:
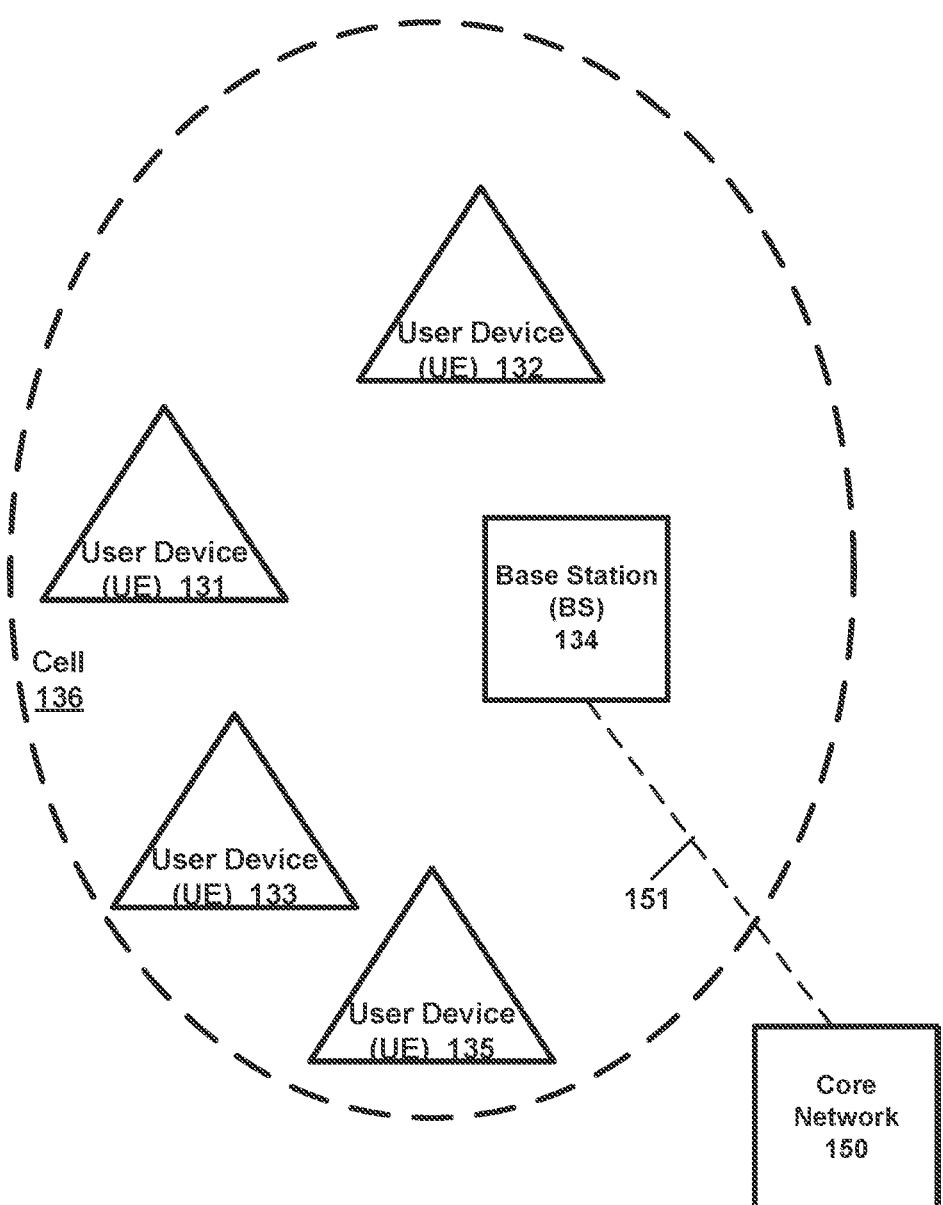
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

In a connected mode (e.g., RRC-Connected) with respect to a cell (or gNB or DU), the UE is connected to a BS/gNB, and the UE may receive data, and may send data (based on receiving an uplink grant). Also, in a connected mode, UE mobility may be controlled by the gNB or network.

In order to conserve power, a UE may, for example, transition from a connected state (e.g., RRC_Connected) to an unconnected state, such as an Idle state (e.g., RRC_Idle) or Inactive state (e.g., RRC_Inactive), e.g., in which the UE may sleep (a low power state) much of the time while in Idle or Inactive state. In Idle state or Inactive state, the UE does not have a connection established with any cell, and mobility (e.g., determining which cell the UE will be camped on or which cell to select as the serving cell for the UE) is controlled by the UE. Inactive state (e.g., RRC_Inactive) may also be referred to as a suspended state of the UE. While in Idle state or Inactive state, the UE may sleep much of the time, and then periodically wake (e.g., changing from a low power state to a full-power state) to perform one or more tasks or processes, e.g., such as receiving system information from the cell the UE may be camped on (the serving cell for the UE while in Idle state or Inactive state), detecting a paging message (a paging message detected by the UE may indicate that the network has data for downlink transmission to the UE), and/or performing a cell search and cell reselection process in which the UE may measure reference signals from various cells, and then select a cell (or reselect the same cell) to camp on (as the serving cell), based on the received signals from various cells. Thus, as an example, cell selection may include selecting a cell that has a strongest reference signal received power (RSRP) and/or reference signal received quality (RSRQ), or other signal parameter. Thus, in Idle state or Inactive state, the serving cell may be referred to as the cell the UE has camped on. For example, a UE may typically receive system information (e.g., via receiving one or more broadcast system information blocks (SIBs)) from the serving cell (or the cell the UE is camping on) while the UE is awake in Idle state or Inactive state.

Example implementations relate to network energy conservation. Network energy can be conserved using time-domain techniques. For example, energy can be conserved through a reduced number of active symbols including for beam training and/or by broadcasting and/or common signal periodicity adaptation. Network energy can be conserved using frequency-domain techniques. For example, energy can be conserved through reduced SIB and/or paging transmission in some carriers. Network energy can be conserved using power-domain techniques. For example, energy can be conserved through improving PA efficiencies at gNB and related processing at gNB/UE.

Example implementations describe techniques on the gNB and UE side to improve network energy savings in terms of both BS transmission and reception. The techniques can include a more efficient operation dynamically and/or semi-statically and finer granularity adaptation of transmissions and/or receptions in one or more of network energy saving techniques in time, frequency, spatial, and power domains, with potential support/feedback from UE, and potential UE assistance information. For example, an implementation can include a method of reducing and/or adapting transmission and/or reception of common channels and/or signals (e.g., SSB, SIB1, other SI, paging, PRACH) and its impact to initial access procedure, cell (re)selection, handover, synchronization and measurements performed by the idle/inactive/connected UE. For example, an implementation can include adaptation of transmission power and/or processing and/or reception processing of signals and/or channels by the gNB, including, for example, tone reservation techniques to improve PAPR and power efficiency.

Network coverage can be one of the most important factors when commercializing cellular communication networks. Through the development of New Radio (NR), new frequencies have been made available, including much higher frequencies than LTE in FR2-1 (e.g., around 28 GHz and 39 GHz and/or including 24.25 GHz to 52.6 GHz), FR2-2 (52.6-71 GHz) and more spectrum in FR1 (i.e., 3.5 GHz band). As a result of using higher frequencies, the signal can suffer higher path loss, with the consequent degradation in the quality of the received signal, diminishing the coverage of the network for a reasonable quality of service. Coverage problems not only appear at higher frequencies, but also in the newly allocated spectral bands at FR1 (e.g., 3.5 GHz) coverage can be a critical issue because this frequency band may be used for key mobile services such as voice and low-rate data services. Additional frequencies may become available as mobile broadband evolves. For example, 6G may include a 7 GHz to 24.25 GHz frequency range.

In addition, in 5G NR systems at FR2, and generally in millimeter wave (mmWave) communications, the main implementation issues are low power amplifier (PA) efficiency and phase noise (PN) induced distortion. Waveforms with low PAPR may be required to improve PA efficiency. Therefore, waveforms optimizing PAPR may be required. The performance of various channels such as different variations of PUSCH, PUCCH, SSB etc. are measured by considering maximum coupling loss (MCL), maximum path loss (MPL), and maximum isotropic loss (MIL) metrics. The SSB channel can be evaluated in both FR1 and FR2. Based on the performance results, the SSB channel may need coverage enhancement in some cases (e.g., Urban 4 GHz TDD scenario (FR1 DL channel) and Urban 28 GHz TDD NLOS O2I scenario (FR2 UL channel)). Therefore, the SSB channel may require a coverage enhancement solution for both FR1 and FR2 frequency bands.

Therefore, solutions to provide coverage enhancement in SSB channels are needed. Example implementations can solve this problem with waveform design-based PAPR reduction and would satisfy the performance requirements. Further, if the coverage does not need to be increased, one can see the reduced PAPR waveform as a way to more efficiently utilize the PAs which may not dissipate too much power. Stemming from the same problem of coverage enhancements, energy savings can be obtained if lower PAPR signals are used. From the network perspective, SSB is a periodic (block of) signals that is always transmitted, thus, optimizing its PAPR would save energy in the network.

The technical problem solved by the example implementations described herein is how to provide energy saving opportunities for the network when certain periodic signals are required. In the network device (e.g., gNB), these example implementations include paging to determine the number of idle UEs in order to better estimate when to use energy-saving SSB with an energy-saving SSB, having special structure. In the UE, these example implementations include an idle UE receiving a trigger for CB PRACH, the idle UE sends CB PRACH, the UE receives configuration information for specific energy-saving SSB, and the UE decodes SSB based on new energy-saving SSB which have specific SSB structure Accordingly, power consumption reduction in the network side is needed. One of the main contributors to power consumption is the transmission of periodic signals. For example, an estimate is that up to 15% of the time, the gNB is transmitting the periodic signals, such as SSB. Example implementations described herein illustrate an energy efficient SSB transmission. The described energy efficient SSB transmission can improve the energy efficiency of the network and increase the coverage of broadcasted system information. Therefore, example implementations include an energy saving SSB mode to implement energy-saving transmissions.

Example implementations can define a specific paging for gNB to determine the number of idle UEs (or parameter indicative of that) in the cell or within an SSB beam. This kind of paging can trigger a contention based (CB) PRACH transmission for IDLE UEs in a cell. A radio network temporary identifier (RNTI) can be used to trigger the CB PRACH transmissions from idle UEs. In an example implementation, no additional complexity may be added to the UE other than checking additional RNTI. Example implementations can define energy saving paging occasions (i.e., occasions where the UE would monitor the specific paging) to be a separate search space configured by the network (e.g., with a long paging periodicity). In an example implementation, a CB PRACH transmission could use a separate PRACH resource pool (e.g., as compared to PRACH used for initial access). The resources can be derived based on the existing configuration (e.g., a next slot compared to PRACH used for initial access).

The gNB can use this information for determining (e.g., estimating, approximating, and/or the like) the number of idle UEs in the cell. This information can be used to determine a power saving profile for SSB/SIB. For example, if the gNB determines there are less idle UEs than a predefined threshold, the gNB can switch to an energy saving SSB transmission. In an example implementation, if the gNB determines the number of idle UEs is greater than a predefined threshold (e.g., a second predefined threshold), the gNB may not switch to the energy saving SSB transmission mode. The switch to an energy saving SSB transmission may cause power domain savings, time domain savings, or a combination of both.

In the power-domain an energy-saving SSB can use a PAPR reduction technique that takes advantage of the periodicity of the transmissions. For example, tone reservation techniques can be used to improve energy efficiency in gNB transmissions. In the power-domain an energy-saving SSB ON indication (e.g., signal) can be communicated to the UEs (in the cell) as part of the master information block (MIB) or physical broadcast channel (PBCH), when the energy-saving SSB is switched on.

In addition, as part of MIB or PBCH, the network can define (e.g., indicate) the duration of energy-saving SSB. In response to a UE detecting the energy-saving SSB is on, the UE can determine that there is no frequency-domain multiplexing (FDM) between SSB, and any other signal transmitted from the gNB. No FDM between SSB, and any other signal transmitted from the gNB can allow for efficient PAPR reduction of SSB signals at the gNB). Alternatively (or in addition), there can be frequency and/or time resources defined as available for reserved tones which can be used by the gNB for tone reservation technique for PAPR reduction. These resources can be seen as resources not available for PDSCH. The UEs can identify these resources as reserved and/or not-available resources.

In the time-domain when the energy-saving SSB is on, an energy-saving SSB ON indication (e.g., signal) can be communicated to the UEs (in the cell) as part of MIB or PBCH or remaining minimum system information (RMSI) i.e., SIB1 can indicate that the SIB1 periodicity is reduced. Reducing the SIB1 periodicity can reduce the Type0_PDCCH monitoring for UEs supporting this feature (e.g., providing opportunities also for further UE power saving). Paging occasion (PO) monitoring would be the same as SIB1 (RMSI) transmission. In another example implementation, PO monitoring remains the same, but SIB1 monitoring is reduced.

In an example implementation, certain PDCCH monitoring occasions corresponding to Type0_PDCCH can be considered as invalid because of the reduced SIB1 periodicity. For example, every fourth monitoring occasions can be considered as valid monitoring occasions. The monitoring occasions can be determined based on radio frame numbers, and/or configured by SIB1. The remaining monitoring occasions can be considered as invalid monitoring occasions.

In an example implementation (e.g., for cases with long periodicity between consecutive SSB transmissions), transmissions of PSS and SSS portion of SSB can be continued (e.g., in every 20 ms) to facilitate UEs with the time and/or frequency synchronization for (e.g., legacy) UEs. SSB w/o PBCH can enable improved power saving for gNB (e.g., as compared to SSB with PBCH) based on the lower PAPR of PSS and SSS signals when PBCH is not multiplexed.

Figure 2:
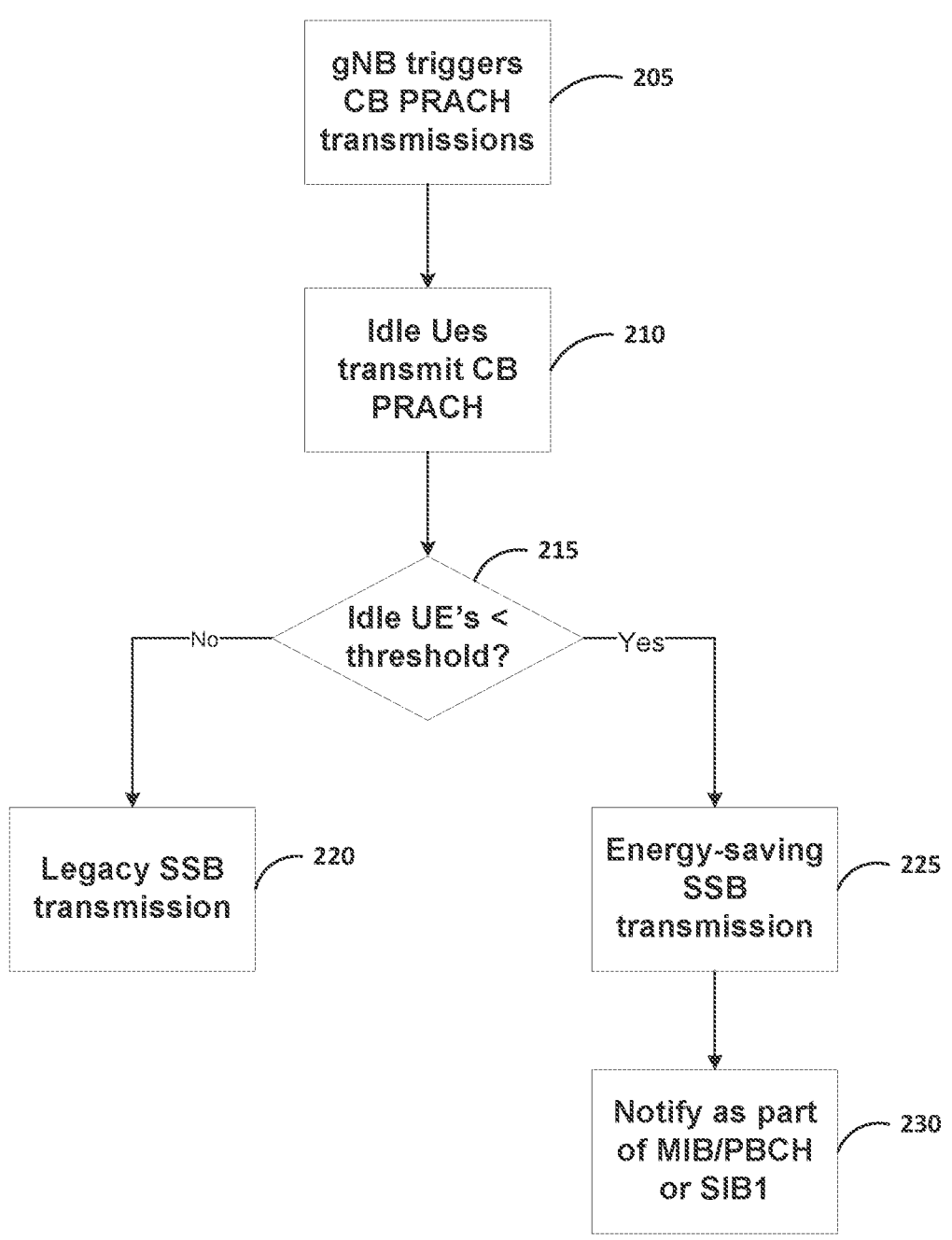
FIG. 2 is a block diagram of a method for operating a network device according to an example embodiment.

FIG. 2 is a block diagram of a method for operating a network device according to an example embodiment. FIG. 2 illustrates an example flow diagram where the gNB triggers CB PRACH transmissions (block 205) for idle UEs in order to determine the number of idle UEs in the cell. CB PRACH transmission can be triggered by a paging message to a RNTI (e.g., energy-saving (ES)-RNTI) where the idle UEs in the cell can receive and transmit the CB-PRACH (block 210). The gNB can compare the number of idle UEs to some threshold number (block 215). The number of idle UEs can be based on the UEs transmitting the CB PRACH. In other words, the number of idle UEs can be calculated based on a quantity of UEs that transmit the CB PRACH. The threshold number can be a design consideration. For example, the threshold number can be based on the number of active UEs in the cell.

In an example implementation, if the number of idle UEs is not less than (e.g., greater than or equal to) the threshold number, legacy SSB transmission can be used (block 220). Otherwise, if the number of idle UEs is less than (or less than or equal to) the threshold number, the gNB can use energy-saving SSB transmissions (block 225). The gNB can then notify (e.g., communicate, signal, and the like) an energy-saving SSB ON indication the UEs (block 230). The gNB can notify the UEs as part of (e.g., an element of) the MIB or PBCH, or SIB1. In an example implementation, the gNB can notify the UEs using a spare bit of MIB.

In an example implementation, there may be no FDM between SSB and other signals transmitted from the gNB. No FDM between SSB and other signals transmitted from the gNB can allow PAPR reduction techniques to further increase the efficiency of the gNB periodic transmission. For example, a lower PAPR waveform can allow further driving the power amplifier closer to saturation. Driving the power amplifier closer to saturation can result in transmitting with higher output power. Transmitting with higher output power can have at least two benefits including increasing the energy efficiency and increasing the coverage. In addition, the UE(s) can reduce the monitoring occasions for Type0_PDCCH, and reduce PO monitoring opportunities because the energy saving transmission mode is in use. Reducing the monitoring occasions for Type0_PDCCH, and PO monitoring opportunities can result in UE power savings.

The SSB transmission can be based on CP-OFDM processing with specific subcarrier allocation defined for four different symbols of SSB. Therefore, generic CP-OFDM processing can be utilized to model the PAPR reduction process. Accordingly, nth sample of time-domain OFDM waveform can be denoted as:

$$x[n] = \sqrt{N} \sum_{k=-N_{act}/2}^{N_{act}/2-1} X[k] e^{\frac{j2\pi kn}{N}}, \tag{1}$$

where, k is the active subcarrier index with $k \in \{-N_{act}/2, -N_{act}/2+1, \ldots, N_{act}/2-1\}$, and X[k] is the kth data symbol in the frequency-domain.

Further, N can be the total number of samples and $N_{act}$ can be the total number of active subcarriers while $N-N_{act}$ frequency-domain bins are zero. Then, the final CP-OFDM signal can be obtained with CP addition and parallel-to-serial conversion. This procedure can be expressed by using matrix notation as:

$$x = vec(T_{CP} W_N^{-1} X), \tag{2}$$

where,

X, $$W_N^{-1},$$

and $T_{CP}$ represent the N×S frequency-domain data symbol matrix with S OFDM symbols, N×N IDFT matrix, and (N+$N_{CP}$)×N CP insertion matrix, respectively, and vec(·) denotes the vectorization operation.

In order to apply the PAPR reduction, PAPR of the CP-OFDM waveform can be computed first. An iterative clipping and error filtering (ICEF) can be an iterative method. Therefore, the PAPR computation can be repeated at every iteration. The iteration index $l \in \{1, 2, \ldots, L\}$ can be introduced. Here, L is the number of iterations. Accordingly, sample-wise PAPR of the generated $$x^{(l)} = [x_0^{(l)}, x_1^{(l)}, \ldots, x_{S-1}^{(l)}]$$

can be computed as:

$$PAPR(x^{(l)}) = 10 \log_{10} \frac{\max_{n=0,1,\ldots,N\times S-1} \{|x^{(l)}[n]|^2\}}{\frac{1}{N \times S} \sum_{n=0}^{SN-1} \{|x^{(l)}[n]|^2\}}, \tag{3}$$

where, max{·} represents the maximum operator, and

|x| is the absolute value of a complex number x.

Then, soft limiter-based clipping is implemented to reduce the PAPR, which can be expressed for target PAPR level $\lambda_{target}$ ($\lambda_{target,dB}$ for dB scale) as:

$$\bar{x}^{(l)}[n] = \begin{cases} A^{(l-1)} e^{\angle x^{(l-1)}[n]}, & \text{if } |x^{(l-1)}[n]| > A^{(l-1)}, \\ x^{(l-1)}[n], & \text{otherwise,} \end{cases} \tag{4}$$

where, $\angle x$ is the phase value of a complex number x, $\bar{x}^{(l)}[n]$ represents the clipped $x^{(l-1)}[n]$, and $A^{(l-1)}$ is an amplitude threshold.

The amplitude threshold which is computed as:

$$A^{(l-1)} = \sqrt{\lambda_{target} E(|x^{(l-1)}|^2)} \tag{5}$$

where,

E(·) represents the expectation operator.

The clipping operation can distribute clipping noise over all the available subcarriers. Therefore, in order to prevent undesired emissions, a filtering operation can be implemented in frequency domain. As an element of the ICEF method, a frequency-selective modulation-specific clipping noise filter can be realized. Subcarriers that are allocated for SSB symbols should be kept noise-free because of the importance of accurate synchronization. Further, the subcarriers at the guard edges may not be used and can be exploited for PAPR reduction. Therefore, the ICEF filter can be suitable as frequency-selective clipping noise allocation can be realized by considering emission limits defined for guard edge subcarriers.

After the clipping operation, clipped time-domain signal is transformed to frequency domain with FFT and then frequency-domain clipping noise signal that is obtained at the lth iteration can be expressed for kth subcarrier as:

$$C^{(l)}[k] = \bar{X}^{(l)}[k] - X^{(0)}[k], \tag{6}$$

where, $\bar{X}^{(l)}[k]$ is the kth data symbol that is obtained at lth iteration from clipped signal through FFT.

The ICEF filter that is applied in the next step, can be defined for kth symbol as:

$$H_{ICEF}^{(l)}[k] = \begin{cases} \dfrac{\varepsilon_k}{|c^{(l)}[k]|}, & \text{if } (k \in \kappa_E) \wedge (\varepsilon_k < |C^{(l)}[k]|), \\ 1, & \text{if } (k \in \kappa_E) \wedge (\varepsilon_k \geq |C^{(l)}[k]|), \\ 0, & \text{if } k \in \kappa_F, \end{cases} \quad (7)$$

where, $\kappa_E$, $\kappa_F$, and $\varepsilon_k$ represent the subcarrier set that is used for clipping noise allocation, clipping noise-free subcarrier set, and the filter weight that corresponds to the predefined threshold, respectively.

Then, clipping noise is filtered by using the ICEF filter and then added back to the data signal, which can be denoted as:

$$X^{(l)}[k] = X^{(0)}[k] + H_{ICEF}^{(l)}[k]C^{(l)}[k], \quad (8)$$

and PAPR reduced CP-OFDM signal is obtained after IFFT and CP addition as:

$$x^{(l)} = vec\left(T_{CP} W_N^{-1} X^{(l)}\right). \quad (9)$$

Computational complexity can grow significantly with each iteration because every iteration contains one FFT and one IFFT. However, the SSB can have some intrinsic advantages as the SSB can have a static subcarrier allocation mechanism and the PAPR behavior of all four different SSB symbols can be unique. Further, the corresponding parameters that are used to configure the SSB symbols can also be static. For example, cell ID may not change. The ICEF method may not need to be applied to these symbols because the first symbol of SSB which includes PSS symbols, can have a low PAPR. In addition, this can reduce the overall complexity of the PAPR reduction applied to SSB.

The ICEF method can be applied once and then the generated peak-cancellation signals can be stored for real-time usage. Further, the filter coefficients that are generated as in (eqn. 7), can be generated once and then stored because the static subcarrier allocation procedure of SSB symbols. Accordingly, the ICEF method may not require too many iterations in SSB as the ICEF method starts to converge after a couple of iterations.

In an example implementation, the number of available subcarriers in $\kappa_E$ can be limited because the frequency resources can be scarce, and a certain number of subcarriers can have an impact on the high peaks. This limitation may also decrease the increase in the power level used for the PAPR reduction subcarriers. In this example implementation, $|C^{(L)}[k]|$ can be ordered for set $\kappa_E$ in descending order and the $N_t$ highest values can be chosen, corresponding to the $N_t$ subcarriers used for PAPR reduction.

Example implementations can include the ICEF method applied for PAPR reduction in SSB transmissions. The ICEF can include two steps including offline (FIG. 3) and online (FIG. 4) processing steps.

Figures 3, 4:
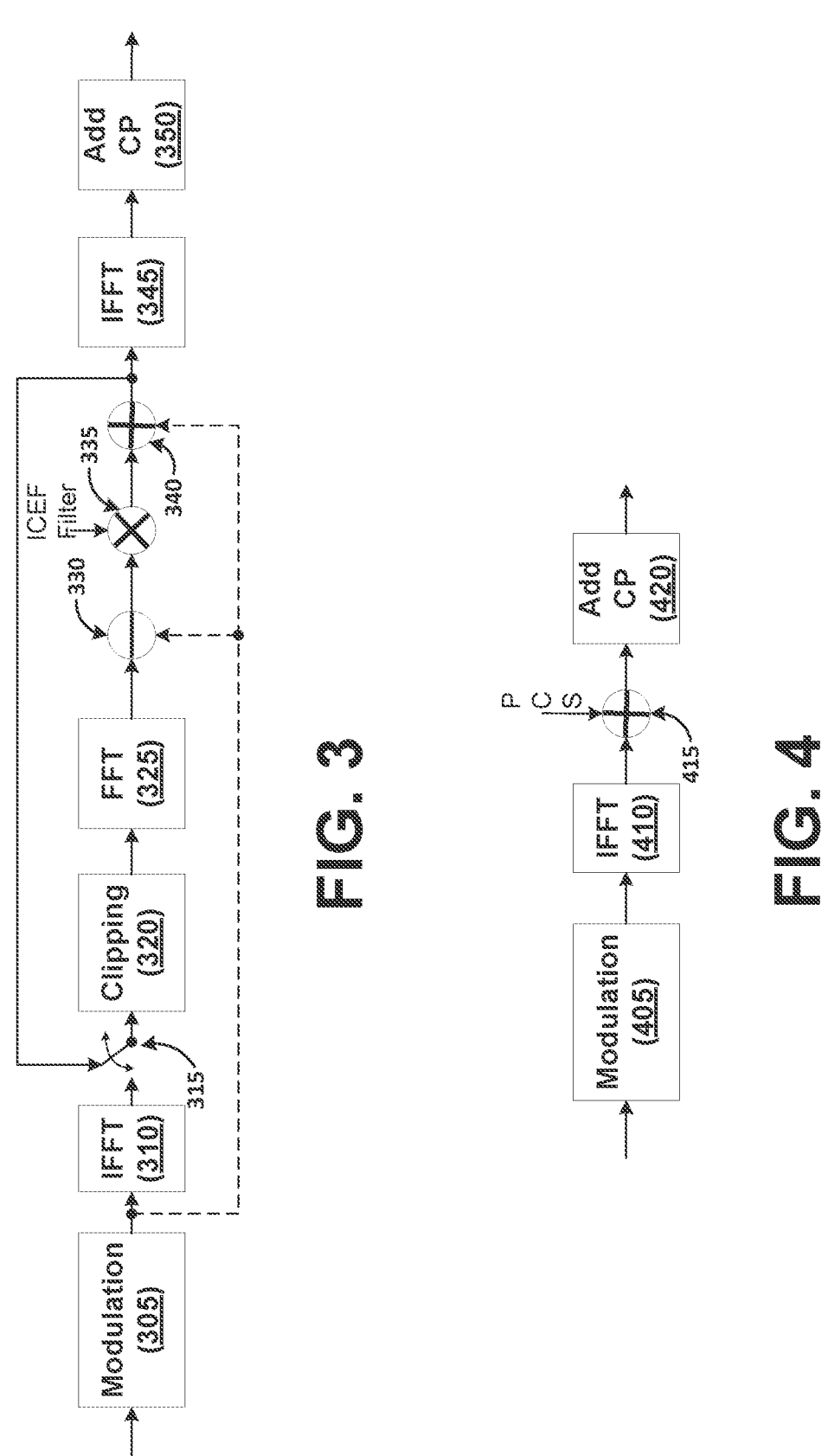
FIG. 3 is a block diagram of a data flow of a network device according to an example embodiment.
FIG. 4 is another block diagram of a data flow of a network device according to an example embodiment.

FIG. 3 is a block diagram of a data flow of a network device according to an example embodiment. As shown in FIG. 3, the data flow includes a modulation 305 block, an Inverse Fast Fourier Transform (IFFT) 310 block, a switch 315 block, a clipping 320 block, a Fast Fourier Transform (FFT) 325 block, an IFFT 345 block, and an add CP 350 block.

The modulation 305 can be configured to generate modulation symbols from bits in accordance with SSB subcarrier generation guidelines. The IFFT 310 can be configured to allocate the data symbols received from the modulation 305 to the corresponding frequency positions and zero-padding can be applied for the remaining positions. Then the IFFT 310 can be applied, and time-domain signal can be obtained. The output of IFFT 345 can be input to switch 315. This feedback loop can be a PAPR reduction loop. For example, the ICEF method can be iterative and applied if the iteration index is less than or equal to the predefined $1_{first}$. Accordingly, switch 315 can be positioned based on the predefined $1_{first}$.

The clipping 320 can be configured to realize the clipping operation defined in (eqn. 4). The clipping 320 can be configured to reduce the PAPR of the signal. The clipping 320 can further be configured to increase the iteration index (i) by one. The FFT 325 can be configured to convert the clipped signal to frequency domain with a FFT operation. However, some alternative implementation might also be considered as the output signal is quite sparse due to the limited number of available frequency-domain subcarriers. Therefore, FFT pruning algorithms or some FFT algorithms that are suitable for sparse signals would be preferred instead of FFT to improve the efficiency.

A subtraction 330 can be configured to remove the clipping-noise signal from the clipped signal because the clipped signal is the combination of data and clipping noise signals. This subtraction 330 can realizes the operation shown in (eqn. 6). Clipping noise filtering 335 can be configured to filter the obtained clipping noise using the ICEF filter defined in (eqn. 7). In an example implementation, only the subcarriers available for PAPR reduction are used. The filtered clipping noise signal is added 340 back to the data signal, which corresponds to the operation shown in (eqn. 8).

IFFT 345 can be configured to convert the clipped signal is back to the time domain with an IFFT operation. Similar to the FFT 325, an alternative implementation can also be considered as the input signal is sparse due to the limited number of available frequency-domain subcarriers. Therefore, FFT pruning algorithms or some FFT algorithms that are suitable for sparse signals would be preferred instead of IFFT to improve the efficiency. The add CP 350 can be configured to obtain the PAPR reduced CP-OFDM signal after the PAPR reduction phase.

FIG. 4 is another block diagram of a data flow of a network device according to an example embodiment. FIG. 4 illustrates the offline processing to generate the PCS for the different symbols transmitted in the SSB. As shown in FIG. 4, the data flow includes a modulation 405 block, an IFFT 410 block, and an add CP 420 block.

The modulation 405 can be configured to generate modulation symbols from bits in accordance with SSB subcarrier generation guidelines. The IFFT 410 can be configured to allocate the symbols received from modulation 405 to the corresponding frequency positions and zero-padding is applied for the remaining positions. The IFFT 410 can then apply the IFFT and obtain a time-domain signal. A peak-cancellation signal can be selected from a storage unit and added 415 to the generated SSB signal to generate the PAPR reduced signal. The add CP 420 can be configured to realize a CP addition after the PAPR reduction phase. The add CP 420 can be further configured to generate the PAPR reduced CP-OFDM signal.

In an example implementation, the properties of SSB can be exploited in order to reduce the PAPR of the periodic transmission to improve the energy efficiency of the network. For example, the properties of SSB can be exploited where PSS and SSS are the same for all the transmissions. Therefore, peak cancellation signals (PCS) for these symbols can be pre-computed and would not require any extra processing in real time. For the symbols carrying PBCH it is also possible to precompute the peak cancellation signals in advance because only a small part of the information varies between transmission. These PCS can be precomputed using the iterative clipping and error filtering (ICEF) technique.

Figure 5:
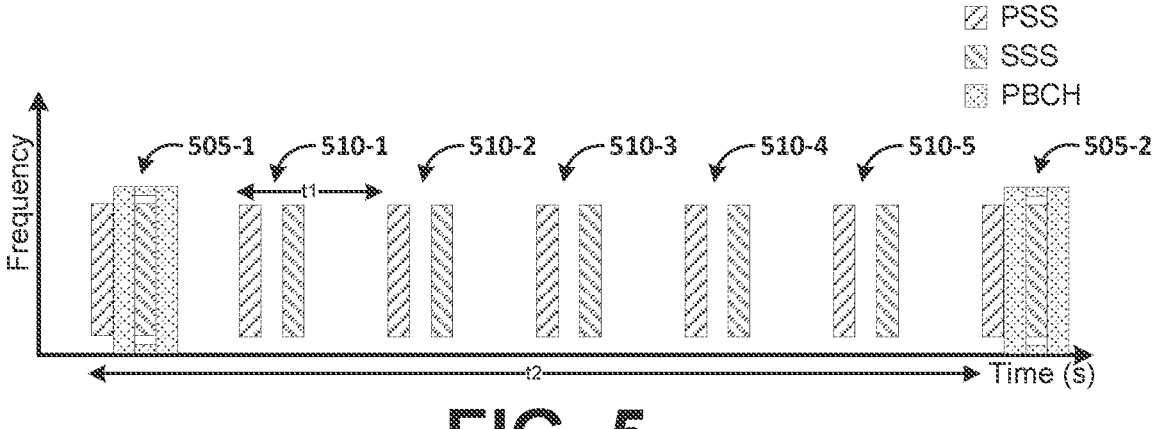
FIG. 5 is a graph diagram of SSB transmissions according to an example embodiment.

In an example implementation, in order to improve energy efficiency of the network, long periodicity between legacy SSB transmissions can be configured (e.g., 160 ms), and smaller periodicity can be configured for SSB transmissions without PBCH (this would facilitate time/frequency synchronization for UEs). An example of the transmissions is shown in FIG. 5. FIG. 5 is a graph diagram of SSB transmissions according to an example embodiment. As shown in FIG. 5, first SSB transmissions 505-1, 505-2 include PSS, SSS, and PBCH blocks, and second SSB transmissions 510-1, 510-2, 510-3, 510-4, 510-5 include PSS and SSS blocks. Time t1 can be a small periodicity (e.g., 20 ms) between SSB transmissions and time t2 can be a long periodicity (e.g., 160 ms) between SSB transmissions.

Figure 6:
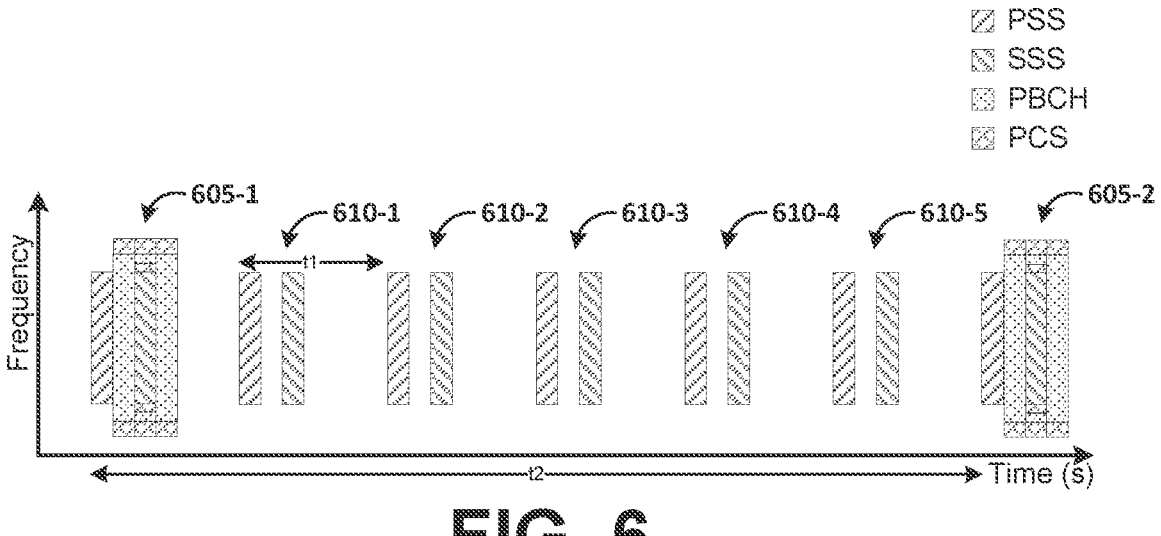
FIG. 6 is another graph diagram of SSB transmissions according to an example embodiment.

In addition, tone reservation techniques to reduce the PAPR of the SSB signal when PBCH is transmitted can be included as part of power domain enhancement. FIG. 6 illustrates such a transmission. FIG. 6 is another graph diagram of SSB transmissions according to an example embodiment. As shown in FIG. 6, first SSB transmissions 605-1, 605-2 include PSS, SSS, PCS, and PBCH blocks, and second SSB transmissions 610-1, 610-2, 610-3, 610-4, 610-5 include PSS and SSS blocks. Time t1 can be a small periodicity (e.g., 20 ms) between SSB transmissions and time t2 can be a long periodicity (e.g., 160 ms) between SSB transmissions.

In the examples of FIG. 5 and FIG. 6, the properties of SSB are exploited in order to reduce the PAPR of the periodic transmission. For example, the properties of SSB are exploited where PSS and SSS are the same for all the transmissions (e.g., second SSB transmissions 510-1, 510-2, 510-3, 510-4, 510-5, and second SSB transmissions 610-1, 610-2, 610-3, 610-4, 610-5). In these SSB transmissions only PSS and SSS are included in the SSB. In other words, PBCH and PCS are not included in the SSB's with the small periodicity (e.g., t1). A long periodicity (t2) between legacy SSB transmissions (e.g., SSB transmissions including PSS, SSS, PBCH (FIG. 5), PCS, and PBCH (FIG. 6)) can be used. The SSB's transmissions configured as shown in FIG. 5 and FIG. 6 can improve the energy efficiency of the network.

Example 1. FIG. 7 is a block diagram of a method of operating a network device according to an example embodiment. As shown in FIG. 7, in step S705 determining, by a network device, a number indicating a quantity of user equipment (UE) that are in an idle state. In step S710 determining, by the network device, whether the network device can operate in an energy-saving transmission mode based on the number indicating a quantity of UE that are in an idle state. In step S715 in response to determining the network device can operate in the energy-saving transmission mode using, by the network device, energy-saving transmissions, and notifying, by the network device, at least one UE being served by the network device of the energy-saving transmissions.

Example 2. The method of Example 1, wherein the determining of whether the network device can operate in the energy-saving transmission mode can include determining, by the network device, whether the number of UE that are in an idle state is less than a threshold number.

Example 3. The method of Example 1, wherein the energy-saving transmissions can be energy-saving synchronization signal block (SSB) transmissions.

Example 4. The method of Example 1 can further include triggering, by the network device, contention based (CB) physical random access channel (PRACH) transmissions and receiving, by the network device, CB PRACH transmissions from a plurality of UEs each in an idle state, wherein the determining of the number indicating a quantity of UE that are in an idle state is based on a quantity of the plurality of UEs.

Example 5. The method of Example 1, wherein the threshold number can be based on a number UEs in an active state that are being served by the network device.

Example 6. The method of Example 1, wherein the notifying of the at least one UE being served by the network device of the energy-saving transmissions can use a spare bit of a master information block (MIB).

Example 7. The method of Example 1, wherein the notifying of the at least one UE being served by the network device of the energy-saving transmissions can use a system information block (SIB).

Example 8. The method of Example 1, wherein the energy-saving transmissions can include using no frequency domain multiplexing between SSB and other signals transmitted from the network device.

Example 9. The method of Example 1, wherein the energy-saving transmissions can include using a long periodicity between legacy SSB transmissions and a smaller periodicity for SSB transmissions without physical broadcast channel (PBCH).

Example 10. The method of Example 1, wherein the energy-saving transmissions can include reducing a peak-to-average-power ratio (PAPR) of an SSB signal when PBCH is transmitted.

Example 11. The method of Example 10, wherein the energy-saving transmissions can include reducing the PAPR of the SSB signal based on a tone cancellation technique or a peak cancellation signal.

Example 12. FIG. 8 is a block diagram of a method of operating a user device according to an example embodiment. As shown in FIG. 8, in step S805 receiving, by a user equipment, a periodic signal including system information with a first configuration, wherein a first signal includes an indication to switch to an energy-saving system information configuration, and the first system information configuration is a legacy configuration. In step S810 in response to the indication, switching, by the user equipment, to the energy-saving system information configuration, wherein the energy-saving system information configuration is different from the first system information configuration by at least one of no frequency domain multiplexing between SSB and other signals, at least one of specific time and frequency resources are reserved for PAPR reduction, corresponding SIB1 periodicity is reduced, PDCCH monitoring periodicity for at least one search space is reduced, and PBCH periodicity is different from that of PSS/SSS.

Example 13. The method of Example 12, wherein the indication can be triggered based on a contention based (CB) PRACH transmitted by the user equipment.

Example 14. The method of Example 13, wherein the CB PRACH can be configured to aid the network device in determining the first configuration or the energy saving system information configuration.

Example 15. The method of Example 14, wherein the CB PRACH can use a separate PRACH resource pool as compared to PRACH used for initial access, derived based on the existing configuration.

Example 16. The method of Example 14, wherein the CB PRACH may not trigger transmission of random access message 2 from the network device.

Example 17. The method of Example 12, wherein the triggering can be done by a specific paging, the specific paging to triggering the CB PRACH can be determined by the user equipment by at least one of a predefined paging occasion, and a predefined RNTI.

Example 18. The method of Example 12, wherein the indication can be included in one of a spare bit of a master information block (MIB), or a system information block (SIB).

Example 19. The method of Example 12, wherein the energy-saving transmissions can include using a long periodicity between legacy SSB transmissions and a smaller periodicity for SSB transmissions without physical broadcast channel (PBCH).

Example 20. A method can include any combination of one or more of Example 1 to Example 19.

Example 21. A non-transitory computer-readable storage medium comprising instructions stored thereon that, when executed by at least one processor, are configured to cause a computing system to perform the method of any of Examples 1-20.

Example 22. An apparatus comprising means for performing the method of any of Examples 1-20.

Example 23. An apparatus comprising at least one processor and at least one memory including computer program code, the at least one memory and the computer program code configured to, with the at least one processor, cause the apparatus at least to perform the method of any of Examples 1-20.

Figure 9:
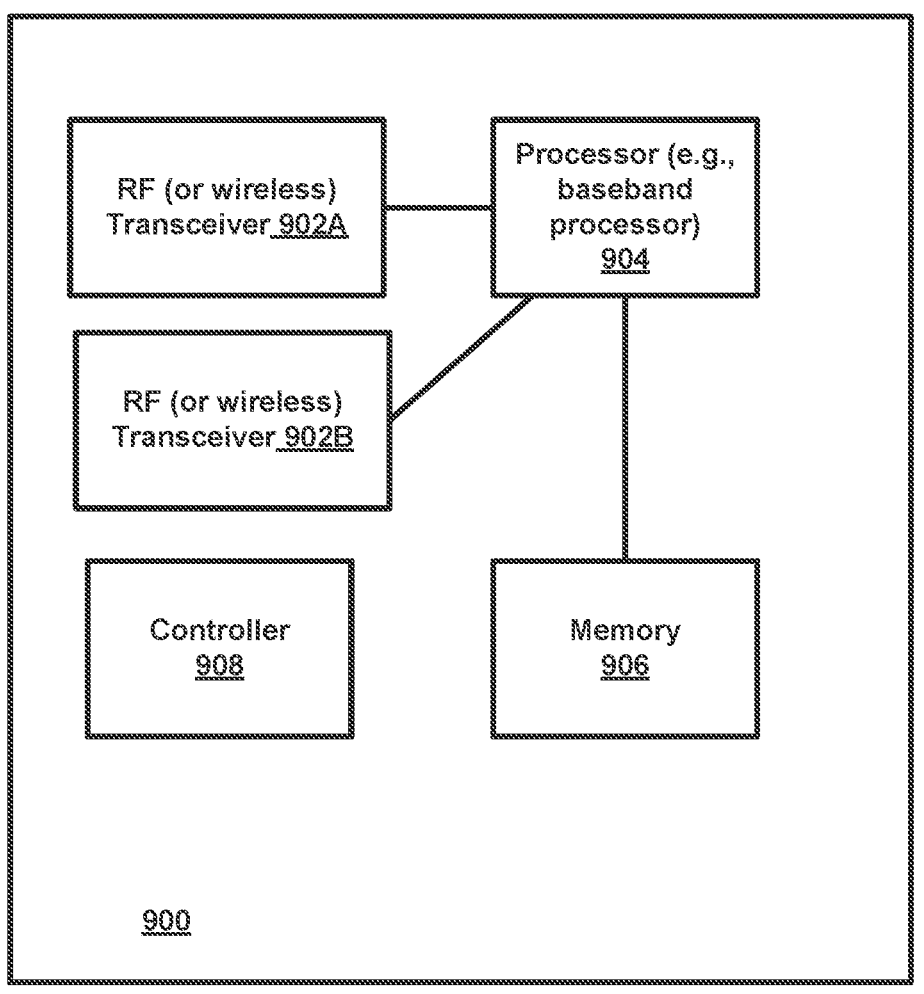
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-UP, . . . or other node according to an example embodiment.

The wireless station 900 may include, for example, one or more (e.g., two as shown in FIG. 9) radio frequency (RF) or wireless transceivers 902A, 902B, where each wireless transceiver includes a transmitter to transmit signals and a receiver to receive signals. The wireless station also includes a processor or control unit/entity (controller) 904 to execute instructions or software and control transmission and reception of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising at least one processor and at least one memory including computer program code, the at least one memory and the computer program code configured to, with the at least one processor, cause the apparatus to:

determine a number indicating a quantity of user equipment (UE) that are in an idle state;

determine whether the apparatus can operate in an energy-saving transmission mode based on the number indicating a quantity of UE that are in an idle state; and in response to determining the apparatus can operate in the energy-saving transmission mode, use energy-saving transmissions, and notify at least one UE being served by the apparatus of the energy-saving transmissions, wherein the determining of whether the apparatus can operate in the energy-saving transmission mode includes determining whether the number of UE that are in an idle state is less than a threshold number;

wherein the threshold number is based on a number of UEs in an active state that are being served by the apparatus;

wherein the energy-saving transmissions includes reducing a peak-to-average-power ratio (PAPR) of an SSB signal when physical broadcast channel is transmitted; and wherein the energy-saving transmissions includes reducing the PAPR of the SSB signal based on a tone cancellation technique or a peak cancellation signal.

2. The apparatus of claim 1, wherein the energy-saving transmissions are energy-saving synchronization signal block (SSB) transmissions.

3. The apparatus of claim 1, the at least one memory and the computer program code further configured to cause the apparatus to:

trigger contention based (CB) physical random access channel (PRACH) transmissions; and receive CB PRACH transmissions from a plurality of UEs each in an idle state, wherein the determining of the number indicating a quantity of UE that are in an idle state is based on a quantity of the plurality of UEs.

4. The apparatus of claim 1, wherein the notifying of UEs being served by the apparatus of the energy-saving transmissions one of:

uses a spare bit of a master information block, or uses a system information block.

5. The apparatus of claim 1, wherein the energy-saving transmissions includes using no frequency domain multiplexing between SSB and other signals transmitted from the apparatus.

6. The apparatus of claim 1, wherein the energy-saving transmissions includes using a long periodicity between legacy SSB transmissions and a smaller periodicity for SSB transmissions without physical broadcast channel.

* * * * *